Figure 18:
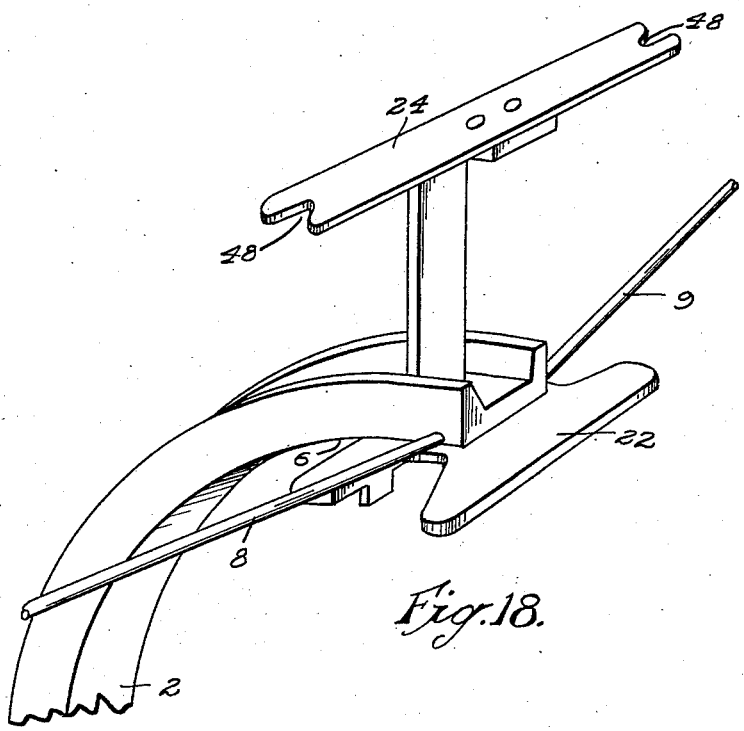

A. F. MARTEL.
MAIL BAG CATCHING AND DELIVERING DEVICE.
APPLICATION FILED SEPT. 13, 1912.
1,065,822.
Patented June 24, 1913.
8 SHEETS—SHEET 1.
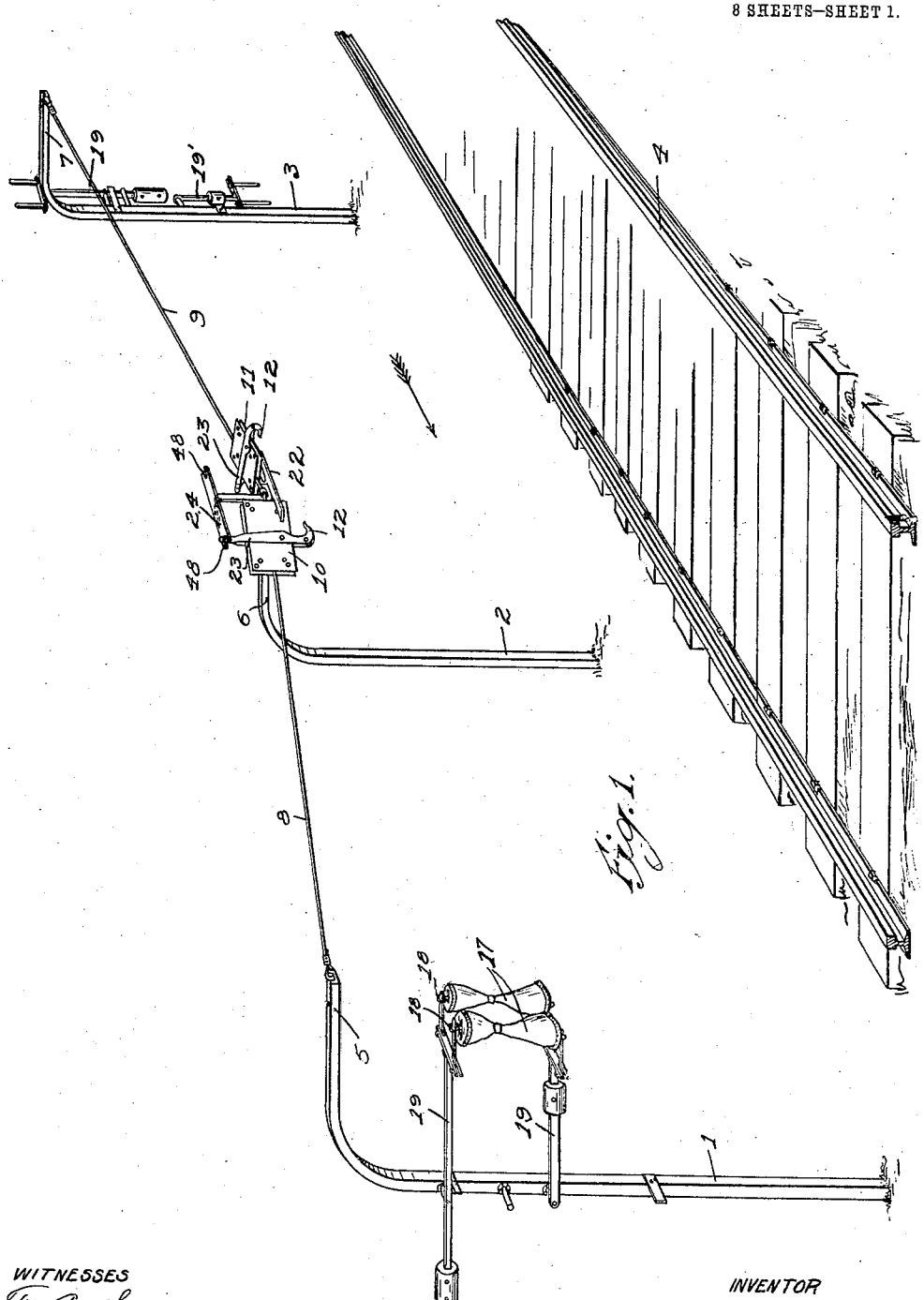
WITNESSES
F. A. Junney
Geo. W. Gates.
INVENTOR
A. F. MARTEL
per A. S. Paré
HIS ATTORNEY

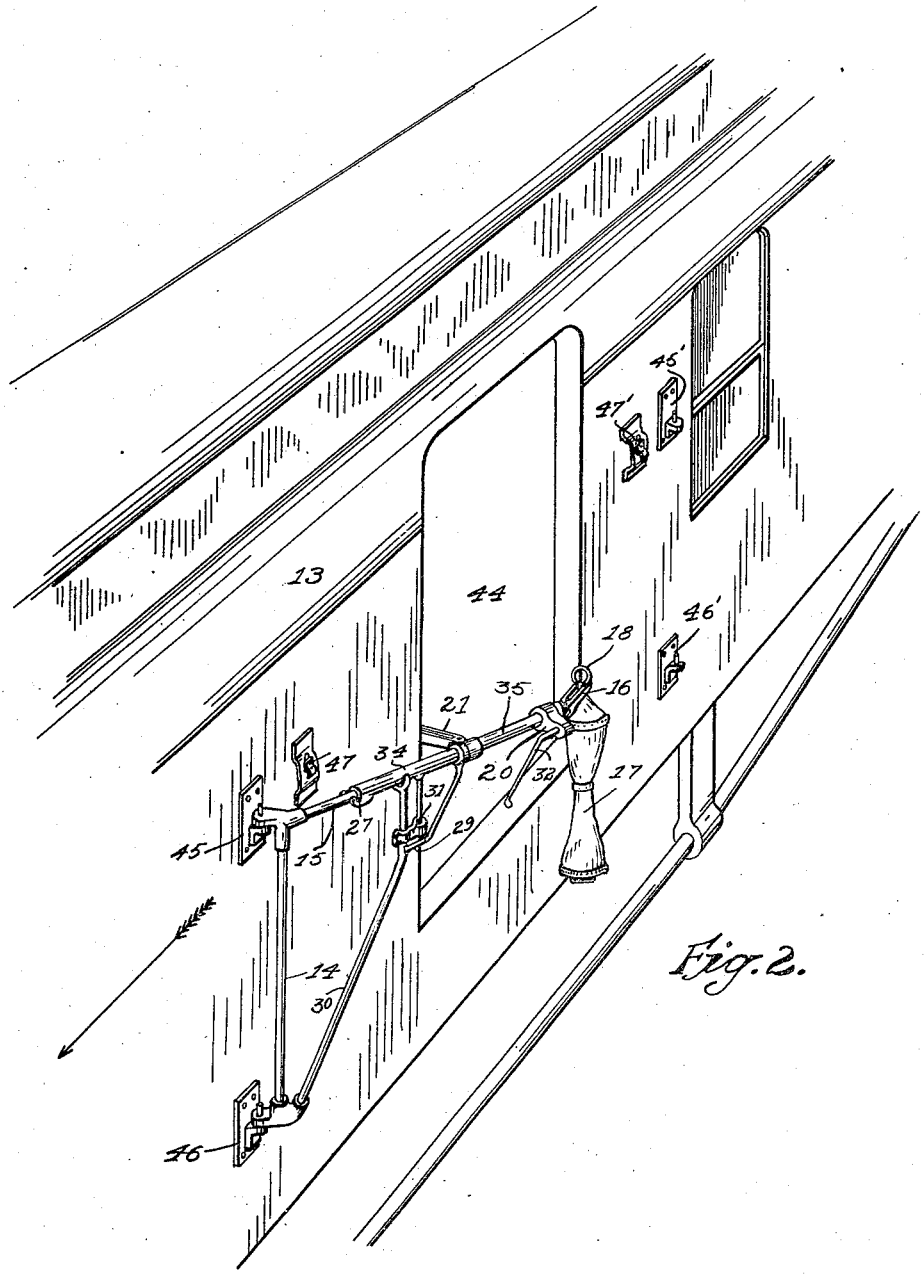

A. F. MARTEL.
MAIL BAG CATCHING AND DELIVERING DEVICE.
APPLICATION FILED SEPT. 13, 1912.
1,065,822.
Patented June 24, 1913.
8 SHEETS—SHEET 3.
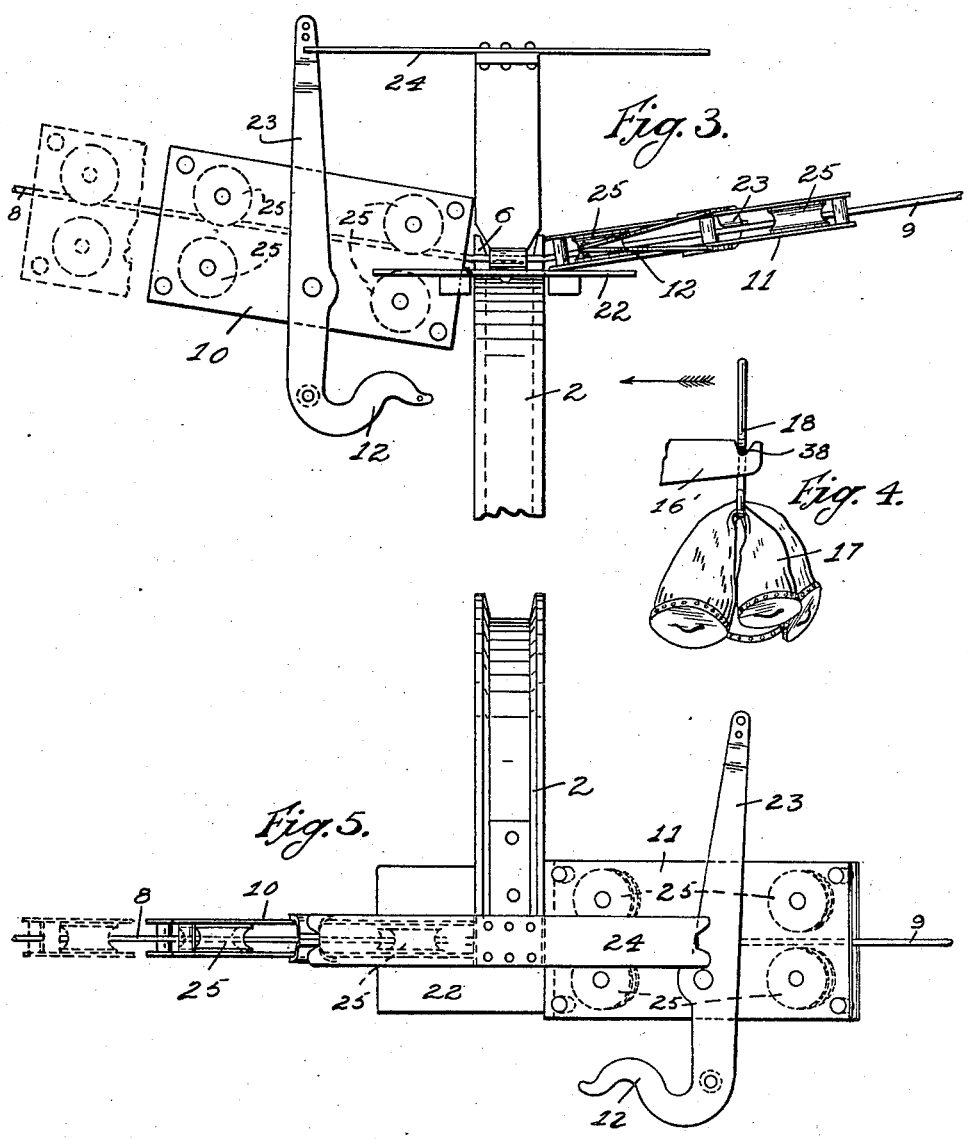

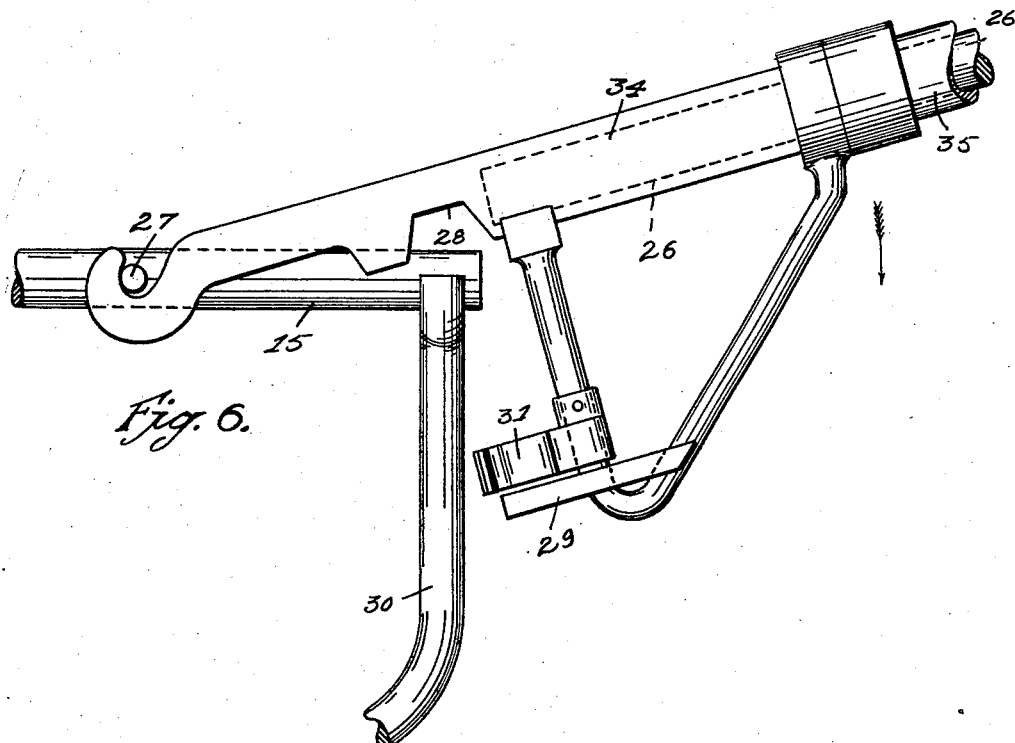
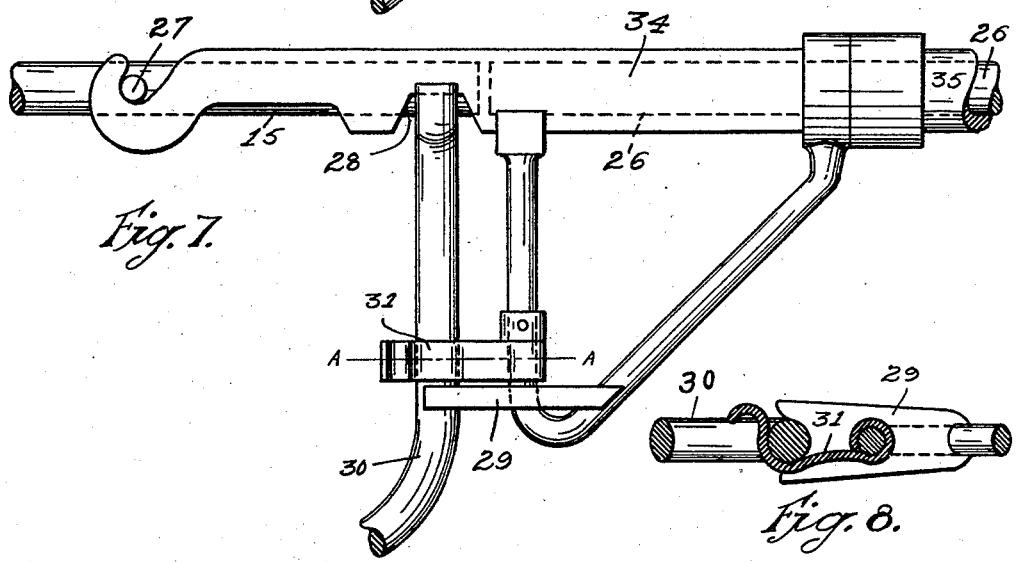

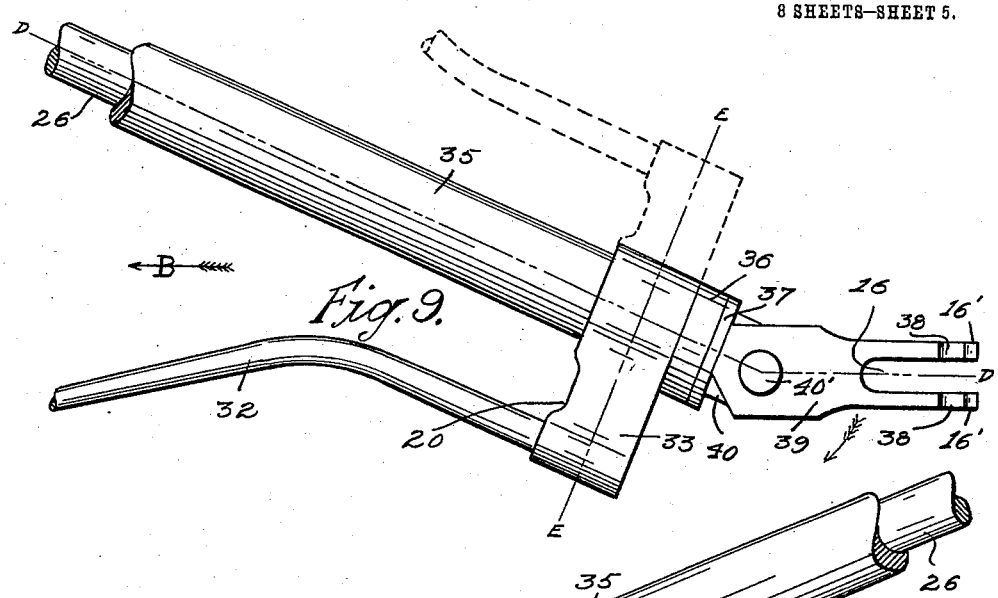
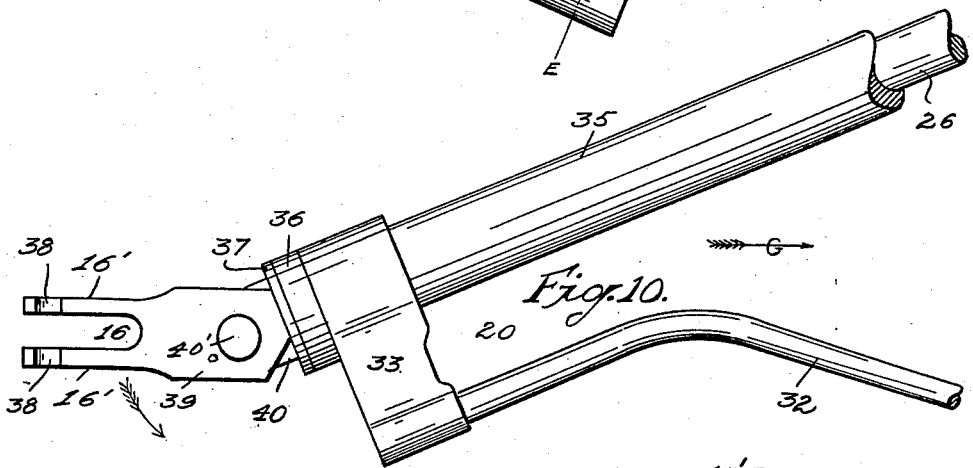
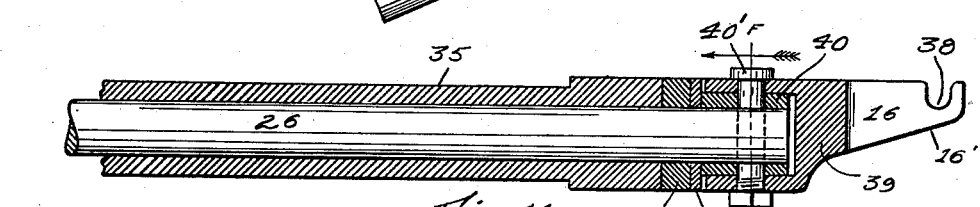
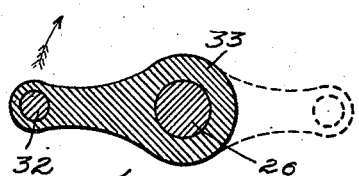
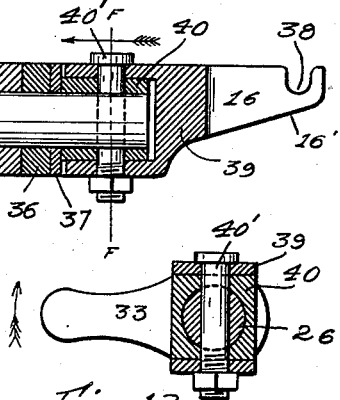

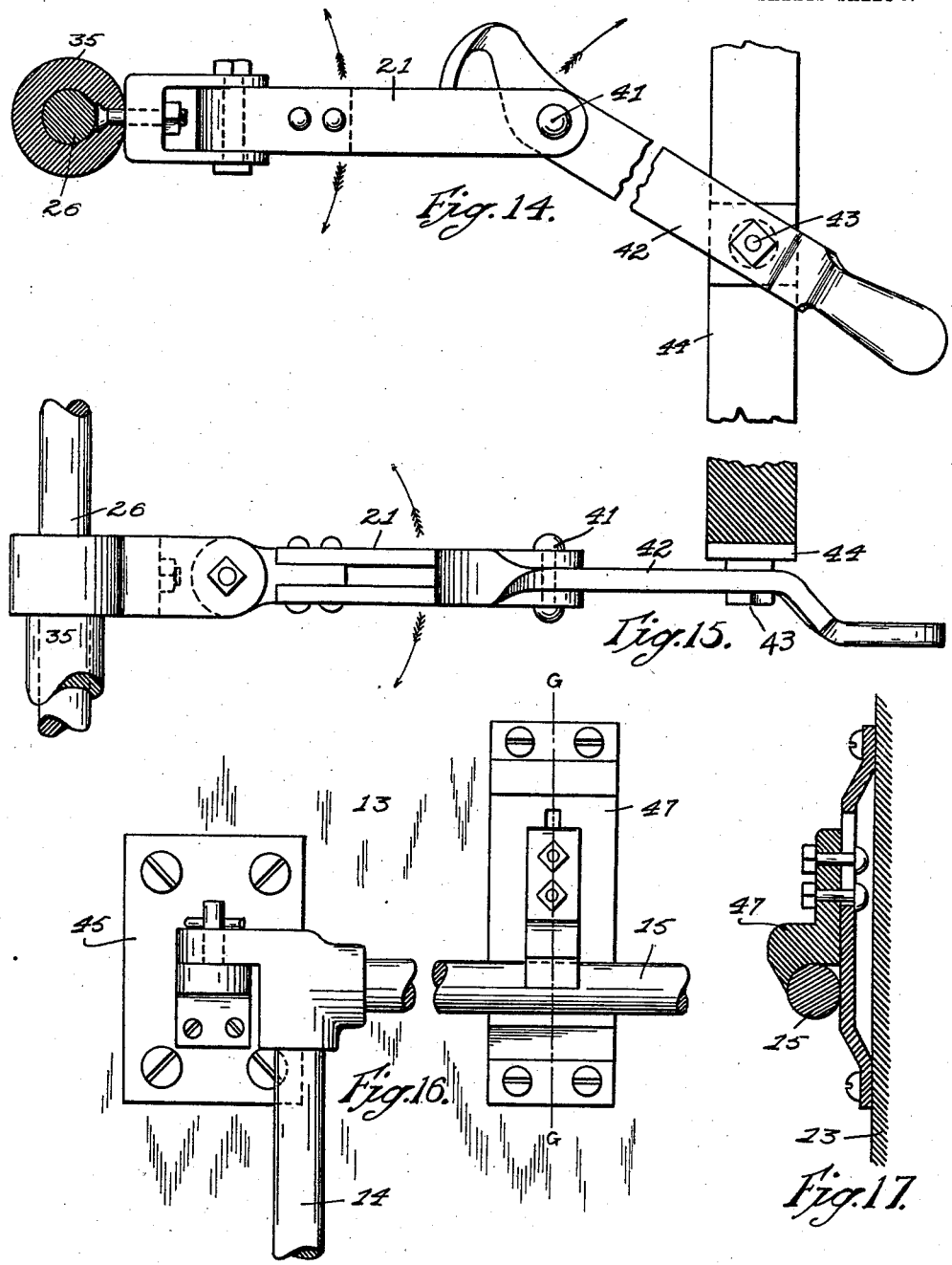

A. F. MARTEL.
MAIL BAG CATCHING AND DELIVERING DEVICE.
APPLICATION FILED SEPT. 13, 1912.

1,065,822.

Patented June 24, 1913.

8 SHEETS—SHEET 7.

WITNESSES
F. A. Simney
Geo. O. Gates

INVENTOR
A. F. MARTEL
per A. S. Paré
HIS ATTORNEY

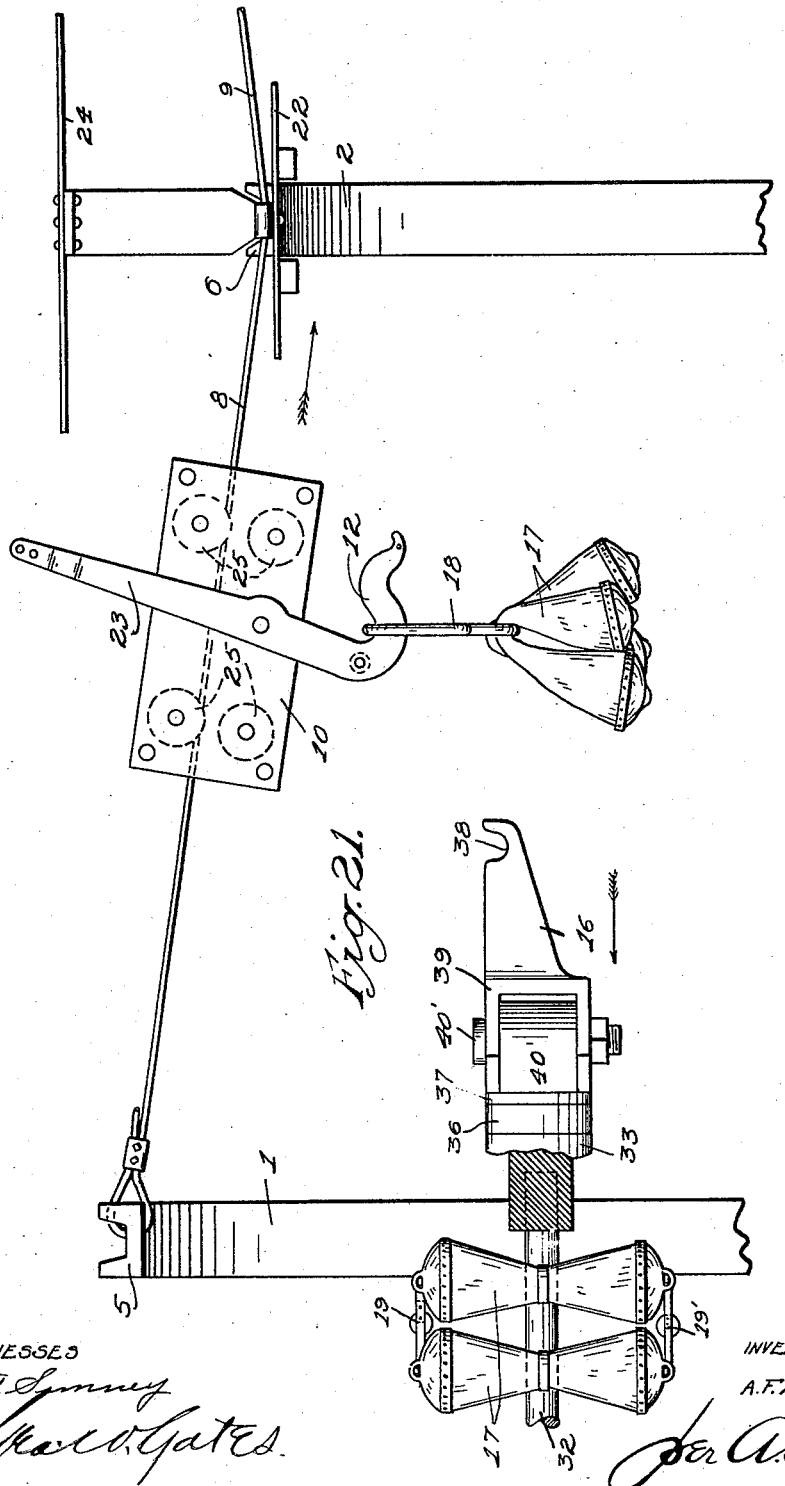

UNITED STATES PATENT OFFICE.

ADELARD F. MARTEL, OF BURLINGAME, CALIFORNIA, ASSIGNOR OF ONE-HALF TO GEORGE W. GATES, OF BURLINGAME, CALIFORNIA.

MAIL-BAG CATCHING AND DELIVERING DEVICE.

1,065,822.

Specification of Letters Patent.   Patented June 24, 1913.

Application filed September 13, 1912. Serial No. 720,235.

*To all whom it may concern:*

Be it known that I, ADELARD F. MARTEL, citizen of the United States, residing at Burlingame, county of San Mateo, State of California, have invented certain new and useful Improvements in Mail-Bag Catching and Delivering Devices, whereof the following is a specification.

My invention relates to devices for delivering mail-bags and similar articles along railway tracks to and from moving trains.

Heretofore the act of delivering mail-bags to which I shall hereafter refer to exclusively in the following description was attended by a shock due to the sudden change of speed imparted to the mail-bag, which tends to break fragile articles contained therein. It is also injuriously destructive to the mail-bags themselves.

Therefore, the primary object of my invention is to provide a device of the character specified, having means for preventing the destructive shocks above referred to.

A second object is to provide means for taking mail-bags from a moving train at substantially the initial speed, and gradually reducing said speed to zero.

A third object is to provide a device of the character specified in which the momentum of the moving bag is gradually overcome by gravity.

Other objects will appear hereinafter in the following description and claims.

With the above-named objects in view my invention consists in a device of the character heretofore mentioned having means for preventing shocks due to the act of delivery.

It also consists in providing means in such device for taking mail-bags, from a moving train at substantially the speed of the train, and gradually reducing said speed to zero.

It also consists in means for gradually overcoming the momentum of a moving mail-bag.

It also consists in the combination with a carrying member mounted on a train, of a receiving member fixed adjacent to the track, comprising a rider adapted to run on an inclined cable, and having a hook for catching the mail-bags to be delivered.

It also consists in the novel parts, combinations and arrangements set forth in the following description, particularly pointed out in the claims at the end hereof and illustrated in the accompanying eight sheets of drawings which form a part of this application.

In carrying out my invention I use a stationary member consisting of two terminal cranes located suitably near a railroad track, and a middle crane of lesser height; and I extend cables from the terminal cranes to the middle crane, the cables being given a downward direction toward the middle crane; and on the cables I mount riders which are adapted to move up and down the length of the cables. On the riders I provide hooks adapted for catching mail-bags by rings attached thereto, the momentum of the bags as they come from the moving car tending to lift the rider along the incline of the cable. Said lifting causes work to be done against the force of gravity, and gradually overcomes the momentum of the mail-bag. On the car I provide a complementary member for delivering the mail-bags to the riders on the cables, which consists of a pivoted arm having a removable end piece provided with means for holding a ring attached to a mail-bag in line with the hook of the rider. I also use mail-bag supports located on the cranes, and a catching device on the end of the same arm and end piece, which provides for picking up mail-bags from stations, and also other features which will be hereinafter described in detail.

Figure 19:
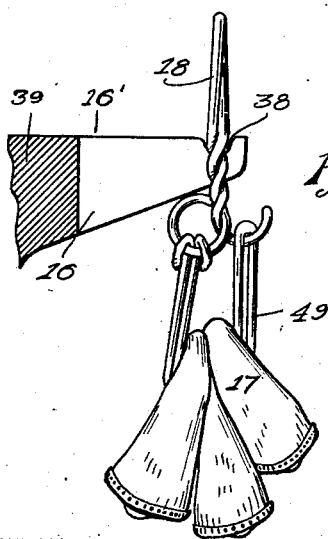
Figure 20:
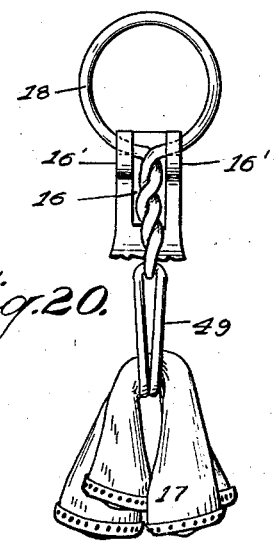

In the drawings Figure 1, is a perspective view of three cranes supporting an inclined cable in over-hanging position along a railroad track, also showing riders provided with catching means mounted on said cable and delivering devices secured respectively to the side cranes one of said riders and delivering device being as it appears in position to receive from and deliver mail-bags to a mail-car moving in the direction as indicated by the arrow, also showing two mail-bags to be delivered to the car. Fig. 2, is also a perspective view showing a mail-car equipped with a projecting arm, provided respectively with delivering device and catching means, also showing a mail-bag to be left at the station. Fig. 3, is a side elevation of the upper portion of the middle supporting crane showing also a portion of the hanging cables and the riders thereon, one of which being in position to receive mail-bags from the passing car. Fig. 4, is a broken end portion in elevation of the delivering device of the projecting arm shown in Fig. 2, as it appears in a line to deliver several mail-bags thereon to the catching means shown in Fig. 3. Fig. 5 is a plan view of Fig. 3. Fig. 6 is a side elevation of a broken portion of the projecting arm secured to the mail-car showing the removable end thereof, as it appears in the act of being placed in position upon the arm. Fig. 7 is a similar elevation to Fig. 6, but showing the removable end secured in position upon the arm. Fig. 8 is a cross section of a portion of the arm and its removable end taken on dotted line A A of Fig. 7 showing particularly the guiding and locking means for said removable end. Fig. 9 is a plan end view of the projecting arm showing particularly the delivering device and catching means as they appear in position when the mail-car moves in the direction indicated by the arrow B. Fig. 10 is a similar plan view to Fig. 9, but showing all the parts reversed as they appear in position when the mail-car moves in the direction indicated by the arrow C. Fig. 11 is a longitudinal section taken on dotted line D, D of Fig. 9. Fig. 12 is a cross section taken on dotted line E E of Fig. 9. Fig. 13 is also a cross-section taken on dotted line F F of Fig. 11, looking in the direction of the arrow. Fig. 14 is a side elevation of a combined lever pivotally secured to the door aperture of the mail-car by which the arm thereon is operated, and the arrows indicate the ways the lever may move to accomplish my purpose. Fig. 15 is a plan view of Fig. 14, and the arrows indicate the lateral movements of the lever. Fig. 16 is a side elevation of a part of a mail-car showing a portion of the upper pivoted connection of the arm thereon, and the catch to secure same in a closed position on the mail-car. Fig. 17 is a vertical section of the catch taken on dotted line G G of Fig. 16. Fig. 18 is a perspective view showing the shelf stopper and guides for the catching means, mounted upon the upper portion of the middle crane, also showing part of the cables. Fig. 19 is a longitudinal section of the end portion of the delivering device showing particularly the means for hanging the mail-bags thereon. Fig. 20 is a front elevation of Fig. 19 and Fig. 21, is a side elevation of a portion of the middle and one side crane, the cable and a rider thereon also showing a broken end of the delivering device and a portion of the catching means connected therewith as they all appear after the mail-car has delivered several mail-bags to the catching means of the rider and the catching means of the arm about to remove two mail-bags from the crane the arrows indicating the way the rider and the delivering device move during this operation.

Similar characters of reference denote corresponding parts throughout the several views of the drawings.

Describing first the broader features of my device and referring to Figs. 1 and 2, three cranes or posts 1, 2, and 3, are erected in suitable adjacency to a railroad track 4, the middle crane being shorter than the other two. The upper ends of the cranes carry arms 5, 6, and 7 extending toward the track; and from the extremities of said arms cables 8, and 9, stretch between the cranes. The cables are inclined downwardly from the end cranes toward the middle crane, and mounted thereon are riders 10 and 11, which are provided respectively with hooks, and these parts are made light so as to reduce inertia in operation. On the car 13, a member 14 is mounted, having an arm 15 carrying fork 16 at its extremity which is always pointed oppositely to the direction of the train. To a mail-bag or similar article 17 is fixed a ring 18, which is supported by the fork 16 as shown in Figs. 2, 4, 19 and 20. Arm 15 is moved into a position at a suitable angle to the longitudinal axis of the car, in which position the ring 18 is in line with the hook 12 of the rider 10. Hook 12 has its point directed against the movement of the train, and will therefore engage ring 18 as the car passes; and the inclined cable will not only lift the ring and the mail-bags attached thereto out of the fork 16, but, by reason of the rider's small weight will not suddenly obstruct its speed. Beginning at the initial speed which it had the instant it left the car, the article picked up is lifted by the inclined cable, whereby its speed is gradually reduced without shock and its momentum overcome in doing work against gravity. When it reaches a certain height on the cable at which its momentum is exhausted it returns back to the middle crane as indicated by the arrows in Fig. 21, and remains at rest at that point.

Having explained the broad features of the device for delivering mail-bags from moving trains, I will now explain its broad features for picking up the mail-bags from the stationary and thereafter will give a description in detail of all the novel parts, combinations and arrangements of same.

The article to be picked up is the mail-bag 17 suspended on one of the terminal cranes as at 1, for instance, by a suspending device, consisting of two arms 19 and 19′ having forked ends projecting in operative position toward the track. The extremity of the arm 15 is provided with catching means 20, which hooks the mail-bags about their middle and the shock thereof is diminished in this case by the mobility of arm 15 which is swung about its axis by the resistance of the bags, and thrown inside the car, the lever 21 tending to make the movement relatively slow enough for the purpose.

Describing now the parts in detail, and referring to the riders 10 and 11, two are provided to accommodate trains passing in either direction, and they normally rest in adjacency to the middle crane 2. When a train is expected moving in the direction of the arrow Figs. 1 and 2, rider 10 has its hook 12 in the position shown in Fig. 1, and the body of rider 10 lies between the divisions of the shelf 22, in perpendicular position while rider 11 rests on top of shelf 22 in which position the hook 12 of rider 11 cannot engage the ring 18 of the oncoming mail-bag. Hook 12 forms the extremity of a lever 23, which is pivoted in the rider, and has its top end normally resting against the piece 24, against which the impact causes the lever to push, thus starting the rider on its course over the cable. Rollers 25 allow the rider to move smoothly over its course. When the incoming train moves in the direction opposite to the arrows of Figs. 1 and 2, rider 10 is laid on the shelf, and rider 11 takes the position in which its hook is depending.

Referring next to Figs. 6, 7 and 8, arm 15, has a removable end piece 26, which is hooked or unhooked from said arm by means of the pins 27 on arm 15, the notches 28 on sleeve 34, fork 29 for engaging the brace 30, and the latch 31 which also engages said brace. The utility of said removable end consists in its allowing the car member to be shortened, as between stations. End piece 26 is extended into the operative terminals of the member, which comprise the catching part 20, and the delivery part 16. The catching part is formed by a tongue 32, extending from a bracket 33, on sleeve 35 fixed on removable end 26. Over the end bracket 33 is a rubber buffer 36, covered by a metal washer 37. The delivery part 16 comprises two forks 16' having notches, 38 for holding the ring, 18 of the mail-bag, which lies cross-wise over the forks. The forks project from a block plate 39, which is pivoted to a flat projection 40 on arm 26 by pivot 40'. The block 39 has an angular end forming two faces inclined to its longitudinal axis, one of which at all times lies against the metal washer 37, and gives an angular turn to the forks 16. In Fig. 9 the angle is set in the way appropriate to a car moving in the direction of arrow B. For trains moving oppositely, the tongue 32 is turned to the opposite side of the sleeve 35, as shown in Fig. 10, and in dotted lines of Fig. 9, and the block 39 is turned to present the other angular face to the metal washer 37. Arranged in the manner above described, the same arm will pick up and deliver mail-bags and similar articles to and from trains moving in either direction. To sleeve 35 is attached the lever 21, by a swivel connection, the end of said lever being pivoted at 41 to the handle 42, which in turn is pivoted at 43 to the car aperture 44. The appropriate angle for operating is determined by the position of said lever. A jaw on the end of the pivoted handle depresses arm 21, when the handle is raised inside the car, and shortens the length of the compound lever formed by the arm 21 and the handle, and brings the arm 26 close to the car, where it can be reached by the operator. The member 14 is pivoted to the car in the brackets 45 and 46; and a catch 47 located on the side of the car holds the arm in place when the same is out of use. Another set of brackets and catch 45', 46', and 47' Fig. 2, are located on the opposite side of the door for switching the member 14 to operate on oppositely moving cars.

Returning now to the fixture beside the track, Fig. 18 shows an enlarged view of the structure about the middle crane 2. It shows the shelf 22, and the divisions therein for holding the riders in their operative positions on the cables 8, and 9. It also shows the top piece 24, which is provided with notches 48, at its ends for engaging the end of the lever 23. When it is desired to deliver a number of bags a device is used similar to that shown in Figs. 4, 19, 20, and 21, in which the ring 18 carries suspending members 49 to which the bags are hung.

Having thus described my invention and believing I have produced useful and novel improvements in the art to which the same appertains let it be understood that I do not wish to be limited to the exact construction and arrangement of the several parts composing the same as many changes can be made without departing from the spirit thereof, but

What I claim and desire to secure by United States Letters Patent is:—

1. In a device of the character specified, the combination with a delivery member located on the car, a movable receiving member located along the track, and starting means on said movable member.

2. In a device of the character specified, the combination with a delivery member located on a car, a movable member located along the track, and combined catching and starting means mounted on said movable member.

3. In a device of the character specified, the combination with a delivery member located on a car, a movable member located along the track and a lever on said movable member provided at one end with a catching device and at the other end a starting means.

4. In a device of the character specified, the combination with a delivery member located on a car and a movable member located along the track, and catching and starting devices consisting of a lever pivoted to said movable member, one end of which forms the catching means and the other end the starting means.

5. In a device of the character specified, the combination with a delivery member located on a car, a movable member located along the track, a catching and starting device consisting of a lever pivoted to said movable member one end of which forms the catching means and the other end the starting means, and means for supporting said movable member and adapted to gradually reducing the momentum of a mail bag or similar article on said catching device.

6. In a device of the character specified, a receiving member comprising a suitably supported cable vertically inclined, a rider on said cable normally resting on the lower part of said cable and a lever pivoted to said rider having a hook for catching moving mail-bags and similar articles.

7. In a device of the character specified, terminal cranes, a middle crane lower than said terminal cranes, cables from said terminal cranes to said middle cranes, riders on said cables and a lever pivotally secured to said riders having hooks for catching moving mail-bags and similar articles.

8. In a device of the character specified, a suitably supported vertically inclined cable, a crane at its lowest end having a top piece, a rider on said cable having a pivoted lever with an upward extension adapted to engage said top piece and a hook on its lower extremity.

9. In a device of the character specified, terminal cranes, a middle crane, cables extending from the cranes to said middle crane, a top piece on said middle crane, riders on said cables having pivoted levers with upward extension adapted to engage said top piece and hooks on their lower extremities.

10. In a device of the character specified, a suitably supported vertically inclined cable, a rider having rolling members for riding over said cable, and a lever pivotally secured to said rider having a hook for catching moving mail-bags and similar articles.

11. In a device of the character specified, terminal cranes, a middle crane, cables extending from the terminal cranes to the middle crane in an inclined direction, riders on said cables, a shelf on said middle crane for supporting either of said riders in a non-operative position having divisions for holding the other rider in operative position, and a hook on said rider.

12. In a device of the character specified, the combination with a stationary member of a member carried on the car comprising an arm pivoted on the side of the car, a reversible forked end piece secured to said arm and notches on said end piece for supporting rings attached to the mail-bags.

13. In a device of the character specified, the combination with a stationary member of a member carried on the car comprising an arm pivoted on the side of the car having a removable end piece terminating in a flat portion, a block pivoted to said flat portion having one end formed into two faces set at a suitable angle, a rubber buffer having a metal washer adapted to engage either of said faces, and forks at the other end of said block having notches for supporting rings attached to mail-bags or similar articles.

14. In a device of the character specified, a member carried on the car comprising a pivoted arm, a removable and reversible end piece secured to said arm and a catching part and a delivery part on said reversible end.

15. In a device of the character specified, a member carried on the car comprising a pivoted arm, a removable and reversible end piece secured to said arm, and a catching part consisting of a laterally adjustable tongue extending backward from said end piece.

16. In a device of the character specified, a member carried on the car comprising a pivoted arm, a removable and reversible end piece secured to said arm terminating in a catching part, and a swivel lever having a handle for swinging said arm into proximity with the operator and means for setting said arm in the appropriate angle for operating.

17. In a device of the character specified, a member carried on the car comprising a pivoted arm, a removable end piece secured to said arm, reversible catching and delivering parts secured to said removable end and a latch on the side of the car for holding said arm in non-operative position.

18. In a device of the character specified, the combination with forked bag-supporting members suitably mounted near the track, of a member carried on the car comprising a pivoted arm, a removable end piece on said arm, and a reversible catching device on said end piece.

19. In a device of the character specified, the combination with a forked bag supporting member suitably mounted near the track, of a member carried on the car comprising a pivoted arm, a removable and reversible end piece on said arm, and a laterally adjustable tongue extending backwardly from said end piece adapted to catch said bag between itself and said end piece.

20. In a device of the character specified, a member carried on the car comprising two pair of brackets fixed thereon along the vertical side of the door, an arm provided with a removable end adapted to pivot in either of said pair of brackets, reversible catching and delivering devices adjustably mounted on said end for either direction of the train, and automatic locking latches on the car for securing said arm in its non-operative position.

In testimony that I claim the foregoing I have hereto set my hand in the presence of two witnesses, this 5th day of Sept., 1912.

ADELARD F. MARTEL.

Witnesses:
GEO. W. GATES,
R. M. WOLFE.

Copies of this patent may be obtained for five cents each, by addressing the "Commissioner of Patents, Washington, D. C."